(No Model.)
G. W. PHIPPS.
POTATO DIGGER.
No. 525,361. Patented Sept. 4, 1894.
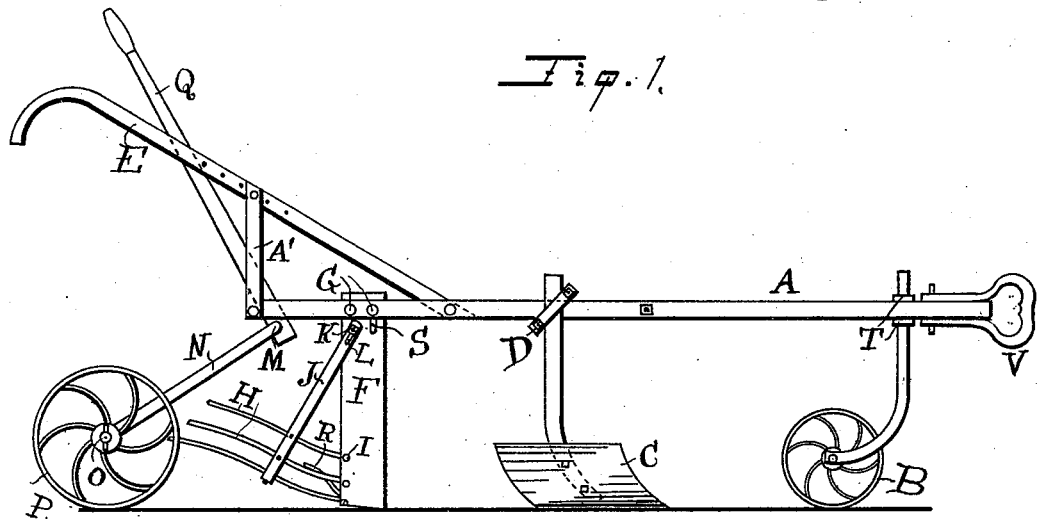
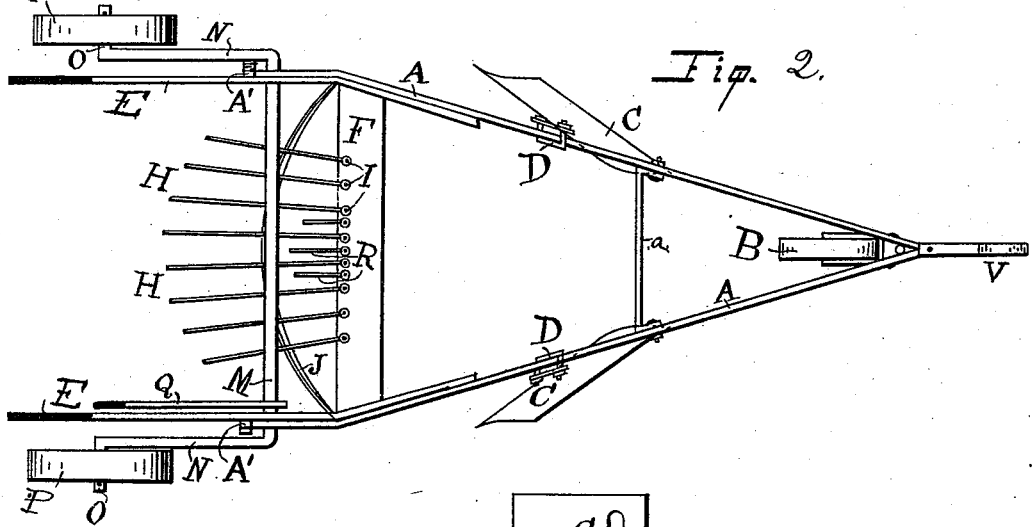
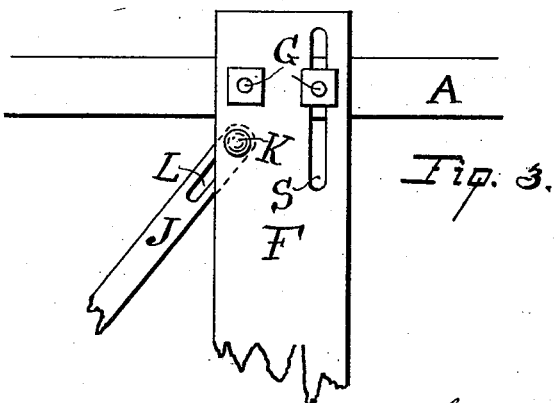
Witnesses
Molbry Haynes
Lillie B. Hodge
Inventor
George W. Phipps
By Joshua B. Webster
Attorney

UNITED STATES PATENT OFFICE.

GEORGE W. PHIPPS, OF LOCKFORD, CALIFORNIA, ASSIGNOR OF TWO-THIRDS TO EDWARD M. LOCKE AND MICHAEL DILLON, OF SAME PLACE.

POTATO-DIGGER.

SPECIFICATION forming part of Letters Patent No. 525,361, dated September 4, 1894.

Application filed January 10, 1894. Serial No. 496,446. (No model.)

*To all whom it may concern:*

Be it known that I, GEORGE W. PHIPPS, a citizen of the United States, residing at Lockford, in the county of San Joaquin and State of California, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain improvements in machines for digging potatoes and similar vegetables, the object of my invention being to provide a machine which will expeditiously and thoroughly unearth such vegetables.

It consists of a V shaped frame provided with plows and bearing wheels and of an adjustably attached U shaped digger blade provided at its rear with fingers and a supporting band, and of such other devices and combination of devices as will be more fully explained, reference being had to the accompanying drawings, in which—

Figure 1, is a right hand side elevation of my improved potato digger. Fig. 2, is a plan view of the same. Fig. 3, is a detached view showing the adjustable features of the U shaped digger blade and the finger supporting band.

Similar letters of reference indicate corresponding parts throughout the entire views.

A, represents the V shaped frame, which is supported at its front by the wheel B.

C, C, are the plows which are adjustably secured to the frame A by staples or clamps D.

E, are handles which are attached to the rear end of the frame A, by means of braces A′, for the purpose of guiding and regulating the position of the machine at will.

F, is the U shaped digger blade which is attached near the rear end of the frame A by bolts G, attached to the frame A and inserted in the digger in the manner hereinafter described.

H, are fingers which are attached to the rear edge of the digger blade F, by means of bolts I, such fingers extending rearwardly at an angle and being further supported by and secured to a finger supporting band J, which is adjustably attached to the digger blade F by means of bolts K, which engage slots L in the ends of the band J for the purpose as will be shown.

M, is a rock shaft, which is suitably attached to the rear end of the frame A, having at each end an elbow N, each of such elbows being provided with a projecting axle O, having thereon wheels P.

Q, is an operating lever which is rigidly attached to the rock shaft M near one end. Should it be desired at any time to transport my improved digger to a great distance, the operator will press the lever Q rearwardly which, as will be seen, will raise the digger blade and plows from off the ground, permitting the same to be easily transported from place to place.

R, are supplemental fingers which are attached to the digger blade at the rear edge and extend rearwardly at a greater angle than the fingers H, as shown in Fig. 1.

The bolts G, are inserted in holes on the rear edge of the digger F, and slots S on the forward edge of the same, such digger blade F and band J may be adjusted by means of the said slots S and L so as to give the best results with reference to the soil in which the machine is being operated.

The front supporting wheel B, is adjusted by means of collars T, which adjustment regulates the depth to which the digger enters the ground.

V, is the draft iron.

a, is a brace rigidly attached to the side of the frame A to stiffen the same.

The wheel B being regulated suitably, the horses are attached to the draft bar in the usual manner and such horses are guided so as to draw the plows C, C, one on each side of the row or hill of potatoes to be unearthed which plows turn the earth away from the hill of potatoes, which operation leaves a ridge or mound of earth which contains the potatoes.

When the digger blade comes in contact with the aforesaid mound, such mound is raised and broken by means of the supplemental fingers R, which earth, after being broken, separates from the potatoes and drops betwen the fingers H, thus leaving the potatoes to fall from off the ends of the fingers H, onto the ground, ready for gathering.

Having thus described my invention, what I claim as new, and desire to secure by Letters Patent, is—

A potato digger, substantially as described, comprising the V-shaped frame A, the wheel B, carried by a hanger connected to said frame, the plows C, having their shanks connected to the side bars of the frame in rear of the wheel B, the U-shaped digger blade F, carrying the rearwardly extending fingers H, and having its vertical portions adjustably connected to the side bars of the frame, the band J, connected to the fingers H, and adjustably connected with the vertical portions of the blade F, the transverse rock shaft M, journaled in the frame and having the angular branches N, and the lateral terminal branches O, traveling wheels mounted on said terminal branches O, and the lever Q, fixedly connected to the rock shaft M, all substantially as and for the purpose set forth.

In testimony whereof I affix my signature in presence of two witnesses.

GEORGE W. PHIPPS.

Witnesses:
JOSHUA B. WEBSTER,
MALBRY HAYNES.